United States Patent [19]

Cason et al.

[11] 4,272,499
[45] Jun. 9, 1981

[54] PROCESS AND APPARATUS FOR THE REMOVAL OF PARTICULATE MATTER AND REACTIVE OR WATER SOLUBLE GASES FROM CARRIER GASES

[75] Inventors: Robert W. Cason, Omaha; Orvis L. Holland, Linden; Floyd C. Russell, Daingerfield; Malley R. Bass; James L. Frier, both of Longview, all of Tex.

[73] Assignee: Lone Star Steel Company, Dallas, Tex.

[21] Appl. No.: 98,069

[22] Filed: Nov. 28, 1979

[51] Int. Cl.³ ............... C01B 17/00; B01D 45/00; B01D 47/10
[52] U.S. Cl. ..................................... 423/242; 55/92; 55/94; 55/223; 55/238; 55/263; 261/79 A; 261/116; 422/128; 422/168; 422/20
[58] Field of Search ............... 55/92, 94, 223, 238, 55/226, 262, DIG. 25; 261/76, 79 A, 115, 118, 78 A, DIG. 78, 116; 423/242 R, 242 A; 422/128, 168, 20

[56] References Cited

U.S. PATENT DOCUMENTS

| 467,264 | 1/1892 | Raymond | 261/79 A |
|---|---|---|---|
| 723,531 | 3/1903 | Jackson | 261/76 |
| 2,675,358 | 4/1954 | Fenley, Jr. | 261/78 A |
| 2,944,386 | 7/1960 | Bertin et al. | 261/118 |
| 3,789,585 | 2/1974 | Arnold et al. | 55/238 |
| 3,812,656 | 5/1974 | Barnhart | 55/220 |
| 3,852,408 | 12/1974 | Ewan et al. | 423/242 |
| 3,852,409 | 12/1974 | Martin et al. | 423/242 |
| 3,894,851 | 7/1975 | Gorman | 55/94 |
| 3,898,308 | 8/1975 | Baum | 261/118 |
| 3,912,469 | 10/1975 | Ewan et al. | 55/238 |
| 4,141,701 | 2/1979 | Ewan et al. | 55/94 |

FOREIGN PATENT DOCUMENTS 925711  5/1963  United Kingdom ............ 261/DIG. 54

Primary Examiner—David L. Lacey
Attorney, Agent, or Firm—Donald E. Degling

[57] ABSTRACT

A process and apparatus for the removal of particulate matter and reactive or water soluble gases from carrier gases is disclosed. The process includes driving the carrier gas through a conduit, in part by a fan or blower, passing the carrier gas through a turbulent free jet emitted from a supersonic nozzle and containing a large number of small high velocity liquid droplets, passing the mixture of the carrier gas and the free jet through a subsonic nozzle, injecting additional liquid as droplets into the mixture, retaining the mixture in a mixing tube to promote the further growth of the liquid droplets and separating the liquid droplets from the carrier gas. The apparatus includes a conduit having mounted therein a supersonic nozzle and liquid injector apparatus located upstream from a subsonic and liquid injector nozzle, a mixing tube downstream from the subsonic nozzle, separating means downstream from the mixing tube and blower or fan means arranged to drive, at least in part, the carrier gas containing pollutant material through the apparatus.

21 Claims, 7 Drawing Figures

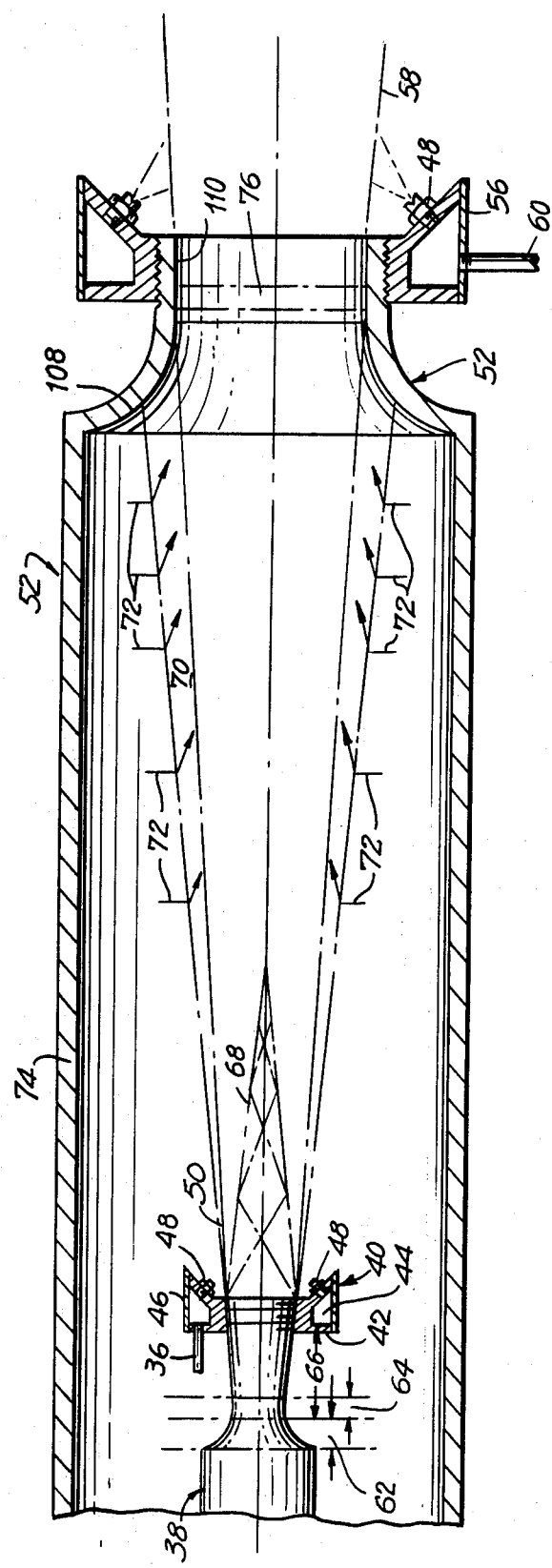

PROCESS AND APPARATUS FOR THE REMOVAL OF PARTICULATE MATTER AND REACTIVE OR WATER SOLUBLE GASES FROM CARRIER GASES

BACKGROUND OF THE INVENTION

1. Field Of The Invention

This invention relates to the field of air pollution control and more specifically to a process and apparatus for the removal of particulate matter and reactive or water soluble gases all of which are known as pollutant material from a stream of polluted carrier gas which may result from the performance of an industrial or chemical process. Thus, the invention relates broadly to a process and apparatus for purifying a polluted carrier gas containing pollutant material such as particulates, gases, vapors or combinations thereof.

Widespread interest in the control of particulates and acidic gases such as sulfur dioxide has been manifested since federal and state legislation relating to polluting emissions was enacted beginning almost ten years ago. Industrial processes such as steelmaking, copper refining, papermaking and others produce gaseous effluents which may contain particulate matter and noxious gases. The particulate matter may be solid or liquid and may vary in both size and chemical composition. With respect to size, the particulate may vary from submicronic particles (particles less than 1 micron in diameter) to relatively large particles which may be a fraction of an inch in size. The chemical composition of the particles depends, of course, on the process involved. While frequently the particulate has no commercial value, there are numerous instances where the particulate, if captured and refined, may yield valuable materials such as iron, zinc, etc. The polluted effluent gases may also vary widely in chemical composition and include relatively harmless gases such as carbon dioxide ($CO_2$), noxious gases such as sulfur dioxide ($SO_2$) and hydrogen sulfide ($H_2S$), and water soluble gases such as hydrogen chloride (HCl).

Originally, the control requirements for particulate were based upon the weight of the particulate matter, i.e. grains per cubic foot ($gr/ft^3$) without much concern for the size of the particulate. However, more recently it has been recognized that the large particulate rapidly settles out of the air and is essentially only a local nuisance but that the fine particulate, in the micron and submicron range (1 micron = $10^{-6}$ meter) may remain suspended in the atmosphere for long periods of time and cover large geographic areas and thus cause a disproportionate degradation of the atmosphere.

While the relatively large particulate may be readily removed from a gas stream by the use of well-known scrubbers such as cyclone scrubbers or venturi scrubbers, fine particulate is much more difficult, if not impossible, to capture and requires the expenditure of far more energy.

The present invention is particularly directed to a process and apparatus for capturing fine particulate with a minimum expenditure of energy.

2. The Prior Art

The present invention represents a further development of research work begun about ten years ago by some of the present applicants. This work is reflected in several patents including Ewan, et al U.S. Pat. No. 3,852,408; Martin, et al U.S. Pat. No. 3,852,409; Ewan, et al U.S. Pat. No. 3,912,469 and, more recently, Ewan, et al U.S. Pat. No. 4,141,701. In these patents, fine particulate is captured by encapsulating or entraining the particulate in high velocity but small size droplets and thereafter causing the droplets to grow in size until they can readily be separated from the gas in accordance with centrifugal or flow detachment or separation principles.

In addition to the prior art specifically identified in the patents referred to above, Raymond U.S. Pat. No. 467,264 shows an early method of purifying smoke by moistening it with steam and then separating the solid particles centrifugally. Jackson U.S. Pat. No. 723,531 discloses an apparatus for condensing smoke, fumes or gases by the use of a steam jet and a pair of water sprays and separating the particles by gravity or by filtration. British Pat. No. 925,711 discloses a liquid dust filter in which the dust-containing gas is accelerated through a narrowing passage or nozzle and then directed against a liquid stream. Gorman U.S. Pat. No. 3,894,851 utilizes water droplets condensed from steam to mix with a polluted gas. Thereafter, the wetted particulate is separated in a cyclone separator. Barnhart U.S. Pat. No. 3,812,656 discloses a fan driven venturi through which the dirt-laden air is drawn. Water is sprayed into the throat of the venturi to wet the dirt-laden air and the dirt and water separated by gravity while the air is exhausted through the fan. Another form of venturi scrubber is disclosed in Baum U.S. Pat. No. 3,898,308 which provides a series of adjustable water jets at the throat of the venturi.

SUMMARY OF THE INVENTION

In accordance with the present invention, applicants have provided a further improvement in the gas cleaning equipment described in the prior Martin, et al U.S. Pat. No. 3,852,409 and Ewan, et al U.S. Pat. Nos. 3,912,469 and 4,141,701 whereby the energy required for the cleaning function is reduced or, alternatively, a greater degree of cleaning may be attained with the same amount of energy.

The polluted carrier gas containing particulate matter is driven through the system, in part, by a fan which may be of the forced draft or induced draft type. The polluted carrier gas may be preconditioned, if desired, by passing it through an atomizer where liquid sprays may be directed in countercurrent relation to the flow of polluted gas. Thereafter, the conditioned carrier gas is directed past a supersonic nozzle driven by a compressible fluid and through a subsonic nozzle, which nozzles are sized, oriented and driven so as to function as free jet ejector pumps within the system. Each of the nozzles is provided with a liquid injector device to form liquid droplets capable, after further atomization, of encapsulating the pollutant material including entraining the particulate matter, dissolving soluble gases or, with the additive of chemicals, reacting with reactive gases. The mixture of carrier gas and particulate-containing droplets is then passed through a mixing tube wherein the droplets grow through processes of impaction and coalescence. Thereafter, the enlarged particulate-containing droplets are separated from the cleaned carrier gas by a centrifugal device such as a cyclone or by a flow detaching or separating device in the form of a modified diffuser or by some other type of separating device.

BRIEF DESCRIPTION OF THE DRAWINGS

Additional advantages of the process and apparatus in accordance with the present invention will become apparent from the following detailed description of the invention and the accompanying drawings in which:

FIG. 5 is a diagrammatic drawing showing the interrelationship between the supersonic nozzle and its associated injector and the subsonic nozzle and its associated injector in accordance with the present invention.

DETAILED DESCRIPTION OF THE INVENTION

Figure 1:
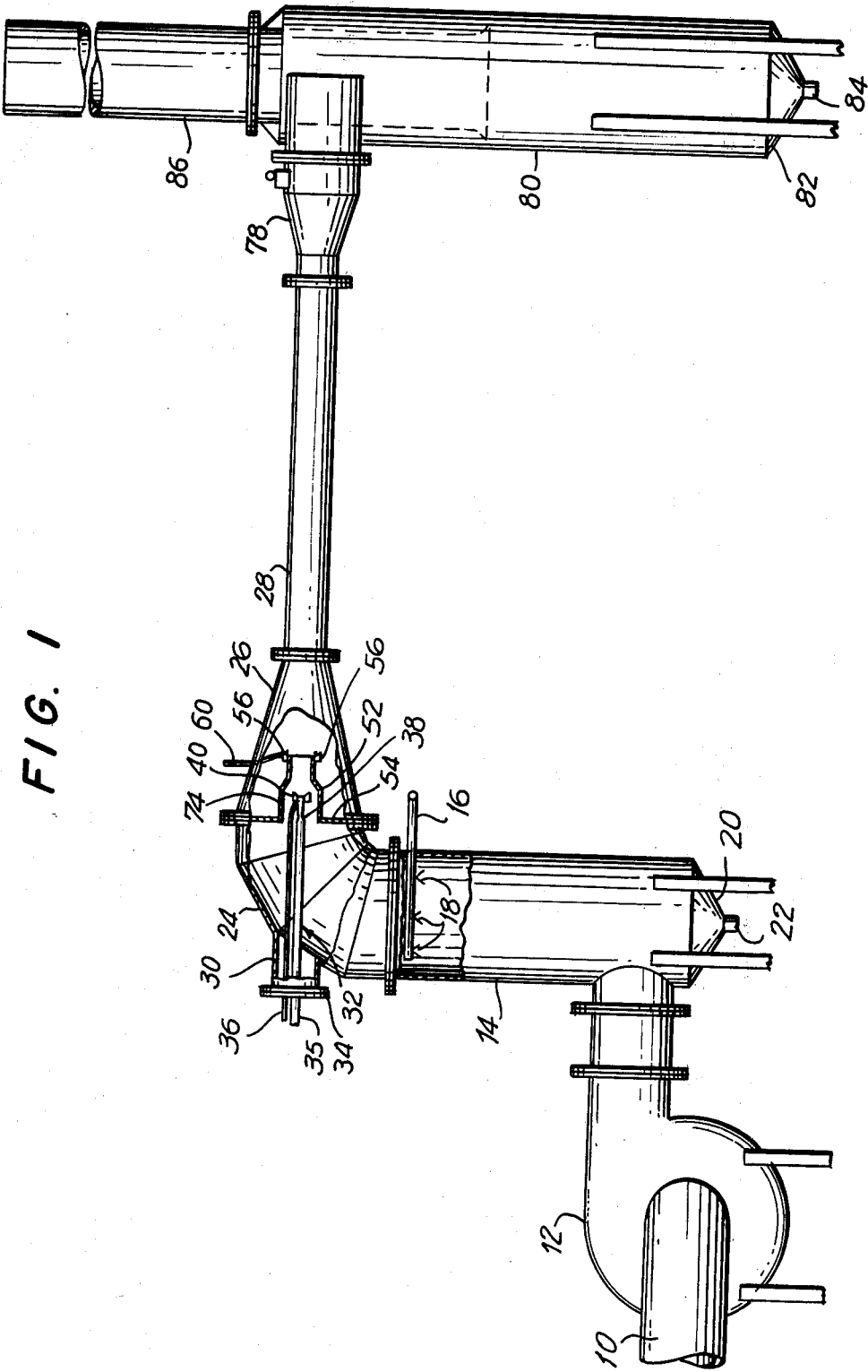
FIG. 1 is a schematic elevational view partly in section showing the apparatus of the present invention and including an optional atomizer wherein a forced draft fan, a supersonic nozzle and injector and a subsonic nozzle and injector are used to drive the system together with a cyclone separator to separate the particulate-containing droplets from the gas stream.

Referring now to FIGS. 1, 10 designates a duct leading from a source of a gaseous effluent such as an industrial or chemical process. The gaseous effluent or polluted carrier gas may comprise particulates, noxious gases, other gases and air. The particulates may include liquid or solid matter of widely varying size, concentration and chemical composition while the noxious gases may include acidic gases such as hydrogen sulfide and sulfur dioxide. The carrier gas may have a wide temperature range varying from ambient temperature to temperatures of several hundred degrees Fahrenheit.

Duct or conduit 10 communicates with the inlet of a fan or blower 12 which may preferably be a centrifugal fan while the outlet of the fan is directed into the lower region of a generally cylindrical conditioning chamber 14 also known as an atomizer. One or more pipes 16 lead into the upper region of the atomizer 14 and carry a series of spray nozzles 18 through which a liquid such as water may be sprayed into the atomizer 14. The flow from the nozzles 18 is preferably countercurrent to the flow of the carrier gas and serves to precondition the carrier gas. In general, the effect of the atomizer 14 is to reduce the temperature and volume of the carrier gas and to increase its moisture content. The conditioning chamber 14 is fitted with a bottom portion 20, preferably conical in shape and having a drain pipe 22 at the low point therein. It will be understood that the liquid, generally water, from the spray nozzles 18 will cause a portion of the pollutant material comprising particulates contained in the polluted carrier gas to become wetted and to settle out of the carrier gas. Thus, the effluent from the drain 22 will be a slurry comprising water and a portion of the particulate contained in the carrier gas. In general, the larger particulate which is relatively easy to capture will be removed in the conditioning chamber 14 while the fine particulate will move past the spray nozzles 18 relatively unscathed.

The top of the conditioning chamber 14 may be connected to an elbow 24, the exit end of which communicates through a reducing section 26 to an elongated mixing tube 28, all of which elements comprise a conduit through which the carrier gas is driven. The interconnections between the conditioning chamber 14, elbow 24, reducing section 26 and mixing tube 28 are preferably formed by flanges affixed to the various parts so that the inside surfaces are smooth thereby minimizing frictional losses.

An extension 30 is formed on the elbow 24 substantially coaxial with the mixing tube 28 through which the supersonic nozzle assembly 32 may be passed. The supersonic nozzle assembly 32 may be mounted on a plate 34 affixed to a flanged end of the extension 30. The supersonic nozzle assembly comprises a compressible fluid supply pipe 35, a liquid supply pipe 36, a supersonic nozzle 38 and a liquid injector 40. The supersonic nozzle and liquid injector are shown in more detail in FIGS. 6 and 7. Referring particularly to FIG. 7, the diverging portion of the nozzle 38 is shown. It will be understood that the nozzle 38 is of the converging-diverging or DeLaval type of nozzle which is capable of accelerating a fluid to a supersonic velocity in and downstream from the diverging portion of the nozzle. The specific design of the nozzle is in accordance with principles known to those skilled in the art and therefore need not be set forth in detail here.

The exit end of the nozzle may be threaded to receive the body 42 of the liquid injector 40. The body 42 is formed with an annular cavity 44 closed by a circumferential band 46. Preferably the band 46 is welded or brazed to the body 42 to form a durable and tight seal. The liquid supply pipe 36 communicates with the cavity 44 through the circumferential band 46 or through the body 42 as may be desired. The forward face of the body 42 is canted toward the axis of the nozzle 38 and carries a plurality of spray nozzles 48 preferably aimed at a common point on the axis of the nozzle 38 downstream from the exit end of the supersonic nozzle. The nozzles 48 communicate with the cavity 44 which functions as a manifold to supply liquid to the nozzles 48. The nozzles 48 are preferably flat spray nozzles such as Delavan type WF flat spray nozzles. Preferably, the number of nozzles and the spray pattern of the nozzles are selected so that the liquid spray pattern substantially encompasses the outer surface of the free jet 50 emerging from the nozzle 38. The atomized droplets of liquid forming the spray pattern from the nozzles 48 will be further atomized and accelerated by the outer core of the free supersonic jet emerging from the nozzle 38. Thus, the outer portions of the free jet 50 will contain a large number of small high velocity liquid droplets, the function of which will be described below.

Returning now to FIG. 1, a subsonic nozzle 52 is mounted in the center of a circular plate 54 which may be fastened between the respective end flanges of the elbow 24 and reducing section 26 so as to be substantially coaxial with the supersonic nozzle 38 and the mixing tube 28. The throat of the subsonic nozzle 52 is considerably larger than the throat of the supersonic nozzle 38 and spaced downstream from the supersonic nozzle. A liquid injector 56 is affixed about the exit end of the subsonic nozzle 52. The liquid injector 56 may be similar in design to the liquid injector 40 though it will necessarily be of considerably larger diameter and thus require a larger number of spray nozzles 48. The purpose of the liquid injector 56 is to produce atomized liquid droplets and deliver the droplets as uniformly as possible to the circumferential surface of the free subsonic jet 58 emerging from the exit end of the subsonic nozzle 52. Liquid, usually water, may be supplied to the liquid injector 56 through a supply pipe 60. It will be understood that the liquid lines 16, 36 and 60 and the compressible fluid line 35 will be provided with appropriate valves, gauges and regulators to assure the proper supply of liquid and compressible fluid to the various nozzles.

Normally the liquid supplied to the liquid injectors 40 and 56 will be water though other liquids can be used. If water is used, it need not be specially treated nor need it be heated and it may contain substantial quantities of suspended solids. Ordinary mill water is generally adequate and water recovered from the slurry which drains from the atomizer 14 and the separating device ordinarily may be recirculated, together with make-up water as required. The compressible fluid for the supersonic nozzle 38 may be steam but air or gases such as nitrogen may also be used. Of course, the design of the supersonic nozzle must be compatible with the particular compressible fluid chosen as will be explained in more detail below.

Reference is now made to FIG. 5 which illustrates in more detail the relationship between the supersonic nozzle 38 and the subsonic nozzle 52. The supersonic nozzle 38, as noted above, is of the converging-diverging type and includes a converging section 62, a throat section 64 and diverging section 66. When the absolute pressure of the gas at the entry of the nozzle is more than about twice the absolute pressure at the nozzle exit, sonic velocity will be attained at the throat 64 and a supersonic velocity will occur in the diverging portion 66. The free jet 50 emerging from the nozzle will expand as suggested in FIG. 5 and will contain a supersonic core 68. Initially, the supersonic velocity will extend substantially across the jet. However, at increasing distances from the end of the nozzle 38 the centerline velocity will drop as the free jet expands. In the circumferential boundary zone 70 the free jet 50 aspirates polluted carrier gas into the jet as suggested by the plurality of arrows 72.

It will be noted that the liquid injector 40 is positioned so that the spray nozzles 48 project a spray of liquid into the circumferential regions of the free jet 50 close to the end of the nozzle 38 where the jet 50 has a maximum velocity. As a result, the free jet 50 is capable of further atomizing the liquid droplets comprising the spray from the nozzles 48 to produce a large number of high velocity liquid droplets which will be concentrated in the circumferential boundary zone 70 of the free jet 50 as it expands.

All of the carrier gas to be cleaned is constrained to flow through an entry tube 74 to which the subsonic nozzle 52 is connected. The supersonic nozzle 38 and subsonic nozzle 52 are aligned coaxially and spaced a sufficient axial distance so that the free jet 50 emerging from the supersonic nozzle 38 will strike the throat portion of the subsonic nozzle 52 in a circumferential region 76 known as the "hook-up" region. At the "hook-up" region 76, the free jet 50 becomes firmly attached to the throat of the subsonic nozzle 52 so that the carrier gas cannot pass between the jet 50 and the throat of the subsonic nozzle 52. In effect, the free jet 50 from the supersonic nozzle 38 and the throat of the subsonic nozzle 52 form an ejector pump which enhances the flow through the subsonic nozzle 52 and the aspirating effect of the jet 50 on the carrier gas.

It will be appreicated, therefore, that all of the carrier gas and the particulate matter contained therein is required to pass through the circumferential boundary zone 70 of the jet 50 which contains a high concentration of very small droplets having a very high velocity relative to the velocity of the stream of carrier gas. The conditions within the circumferential boundary zone 70 of the free jet 50 are thus ideally suited to the wetting and encapsulation or entrainment of the pollutant material which may be contained in the polluted carrier gas by a process of impaction.

Within the free jet 50, turbulent conditions are present which promote further mixing and impaction of the particulate-containing droplets. The free jet 50 also contains a number of shock waves resulting from its supersonic flow characteristics. These shock waves are also believed to enhance the mixing and consequent impaction processes proceeding within the jet. Moreover, the expansion of the jet together with its shock waves induce temperature, pressure and direction changes some of which may be very sudden and which may result in the condensation of steam or vapor to form additional droplets or to increase the size of existing droplets. Of course, particulate matter of droplets may also function as nucleating sites for the condensation of vapor. However, despite the various processes which may function in and around the free jet 50, it is believed that impaction, i.e. collision between the pollutant material and the small high speed water droplets is the principal factor in the capture of the pollutant material, including particulate matter.

A liquid injector 56 formed around the subsonic nozzle 52 provides an additional liquid spray from a series of spray nozzles 48. In a manner similar to that described above with respect to the injector 40 associated with the supersonic nozzle 38, the injector 56 provides a spray pattern which substantially encompasses the outer surface of the free subsonic jet 58. Again, the free subsonic jet 58 will cause a further atomization of the droplets formed by the injector spray nozzles 48. Due to its lower speed, the subsonic jet 58 will be less effective in breaking up the droplets and will also offer less resistance to the penetration of the spray into the jet. Thus, it is believed that the liquid injected by the injector 56 will extend substantially through the free subsonic jet 58 and further mix with the particulate-containing droplets in the jet. Since almost all of the fine particulate orginally contained in the polluted carrier gas will have been captured or entrained by water droplets by the time it leaves the subsonic nozzle, the principal function of the liquid from the injector 56 is to promote the growth of the particulate-containing droplets by providing additional liquid droplets and further mixing to enhance impaction. These mixing, impaction and growth processes are continued in the mixing tube 28 which is of sufficient length to permit the desired growth of the pollutant-containing droplets.

The free subsonic jet 58 emerging from the subsonic nozzle 52 expands as its leaves the nozzle 52 and ultimately engages with the inner surface of the mixing tube 28 at a region also known as a "hook-up" region near the entry end of the mixing tube 28 so as to form a second free jet ejector pump.

At the exit end of the mixing tube 28, the mixture flowing through the mixing tube comprises relatively large particulate-containing drops of liquid and cleaned gas. If the pulluted carrier gas included any soluble gases, a substantial portion of such soluble gases may also have become dissolved in the liquid droplets.

If the polluted carrier gas contained noxious gases such as sulfur dioxide, hydrogen sulfide or other acidic gases, basic chemicals such as calcium hydroxide, sodium hydroxide or ammonia or mixtures thereof may be added to the injected water as set forth in Martin, et al U.S. Pat. No. 3,852,409 in accordance with the principles set forth in Ewan, et al U.S. Pat. No. 3,852,408. If, on the contrary, the polluted carrier gas contained basic gases, acidic chemicals may be added to the injected water to react with the basic gases. Due to the highly effective mixing provided by the present combination of a supersonic and a subsonic nozzle with their associated injectors and mixing tube which form a pair of free jets, both chemical and physical reactions are promoted. The products of chemical reaction, whether solid or liquid, will appear along with the particulate in the liquid droplets and may thus be separated as a slurry.

Figure 2:
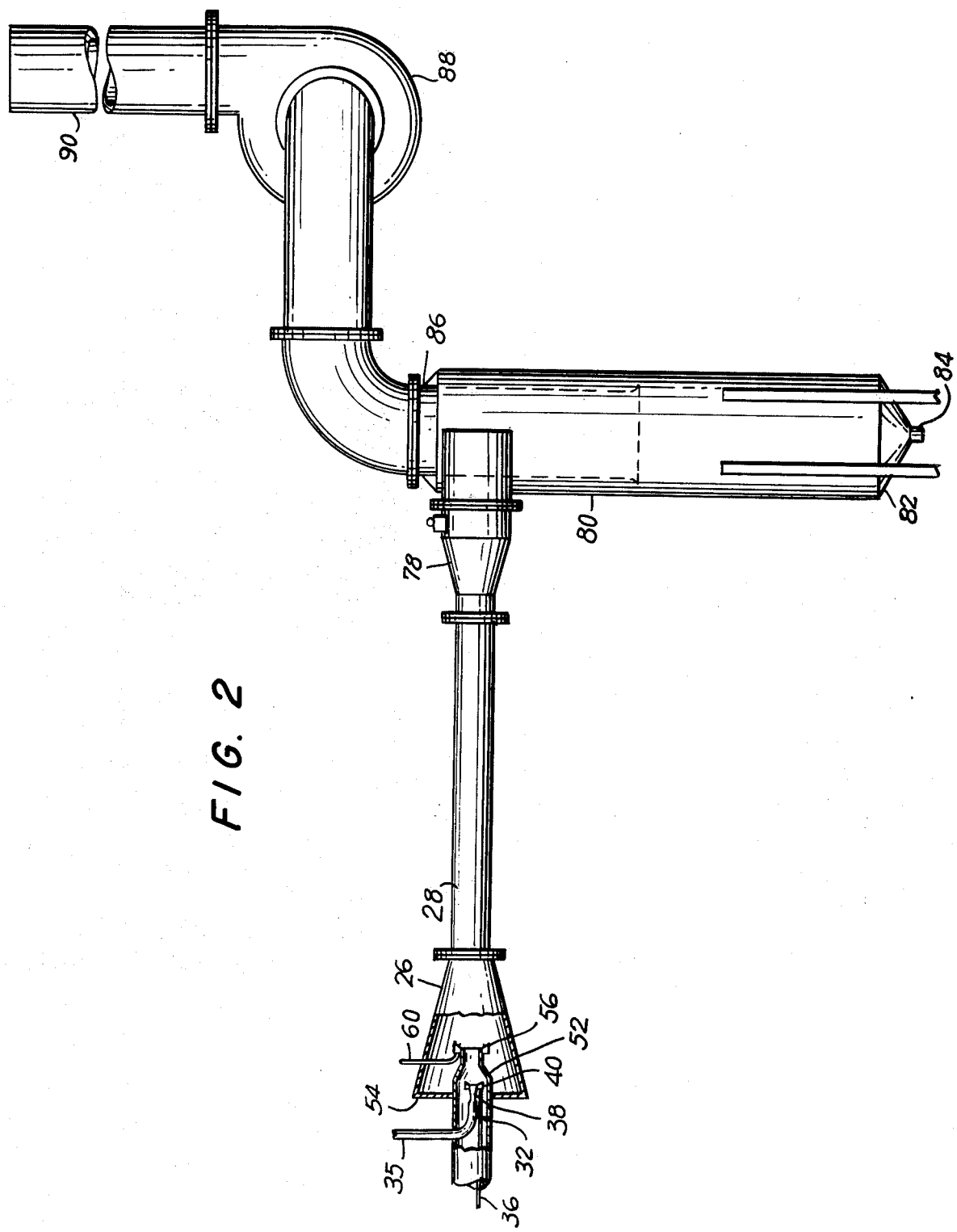
FIG. 2 is a schematic elevational view partly in section showing the apparatus of the present invention wherein the system is driven, in part, by an induced draft fan located downstream from the cyclone separator.

In accordance with the present invention, any desired method of separating the particulate-containing droplets from the cleaned gas may be employed. One such method employing cyclone separators is shown in FIGS. 1 and 2. In this embodiment an accelerator 78 as described in Ewan, et al U.S. Pat. No. 3,912,469 may be provided to accelerate the gas mixture and deliver it adjacent an inside wall of a cyclone separator 80. Within the cyclone 80, the liquid droplets will migrate toward the walls of the cyclone and then run down the walls to the conical bottom portion 82. The liquid and particulate which collects at the bottom of the cyclone 80 may be drawn off as a slurry through the drain 84. The cleaned gas leaves the cyclone 80 through an axially disposed stack 86. While only a single cyclone is shown in FIGS. 1 and 2, it is frequently desirable to utilize a plurality of small diameter cyclones rather than a single larger cyclone since the removal efficiency of a cyclone is an inverse function of its diameter. The use of a pair of small diameter cyclones is illustrated in Ewan, et al U.S. Pat. No. 3,912,469.

In FIG. 2, the stack 86 is shown connected to an induced draft fan or blower 88 the outlet of which is connected to an exhaust stack 90. This arrangement may be preferable to that shown in FIG. 1 in the event that the polluted carrier gas contains corrosive substances that might adversely affect the fan or blower were it in the position shown in FIG. 1.

Figure 3:
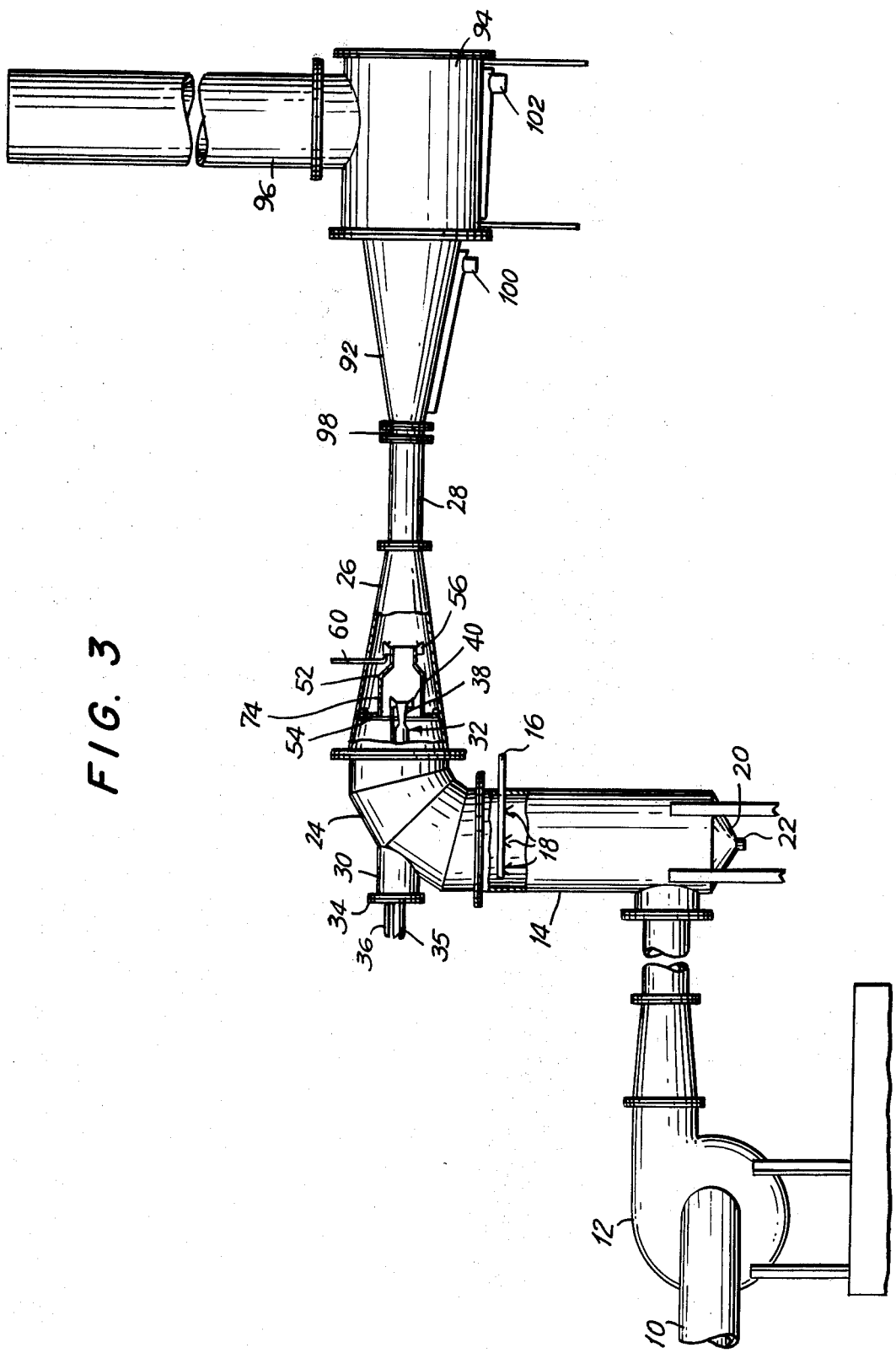
FIG. 3 is a schematic elevational view partly in section showing the apparatus of the present invention and including an optional atomizer wherein a forced draft fan, a supersonic nozzle and injector and a subsonic nozzle and injector are used to drive the system together with a modified diffuser to separate the particulate-containing droplets from the gas stream.

Referring now to FIG. 3, the present invention is illustrated in conjunction with another form of separating device. In this case, the separator comprises a modified diffuser 92, a tailpipe 94 and a stack 96. The modified diffuser 92 includes a flow separating or detaching device 98 which causes the mixture of gas and liquid droplets to be directed away from one wall of the diffuser 92 and towards an opposite wall as described in Ewan, el al U.S. Pat. No. 4,141,701. Thus, as the mixture of gas and liquid droplets is decelerated in the diffuser 92, the liquid droplets coalesce into a slurry of liquid and particulate which flows through the diffuser and into the tailpipe. The slurry may be drawn off at the drains 100, 102 while the cleaned gas exits through the stack 96.

Figure 4:
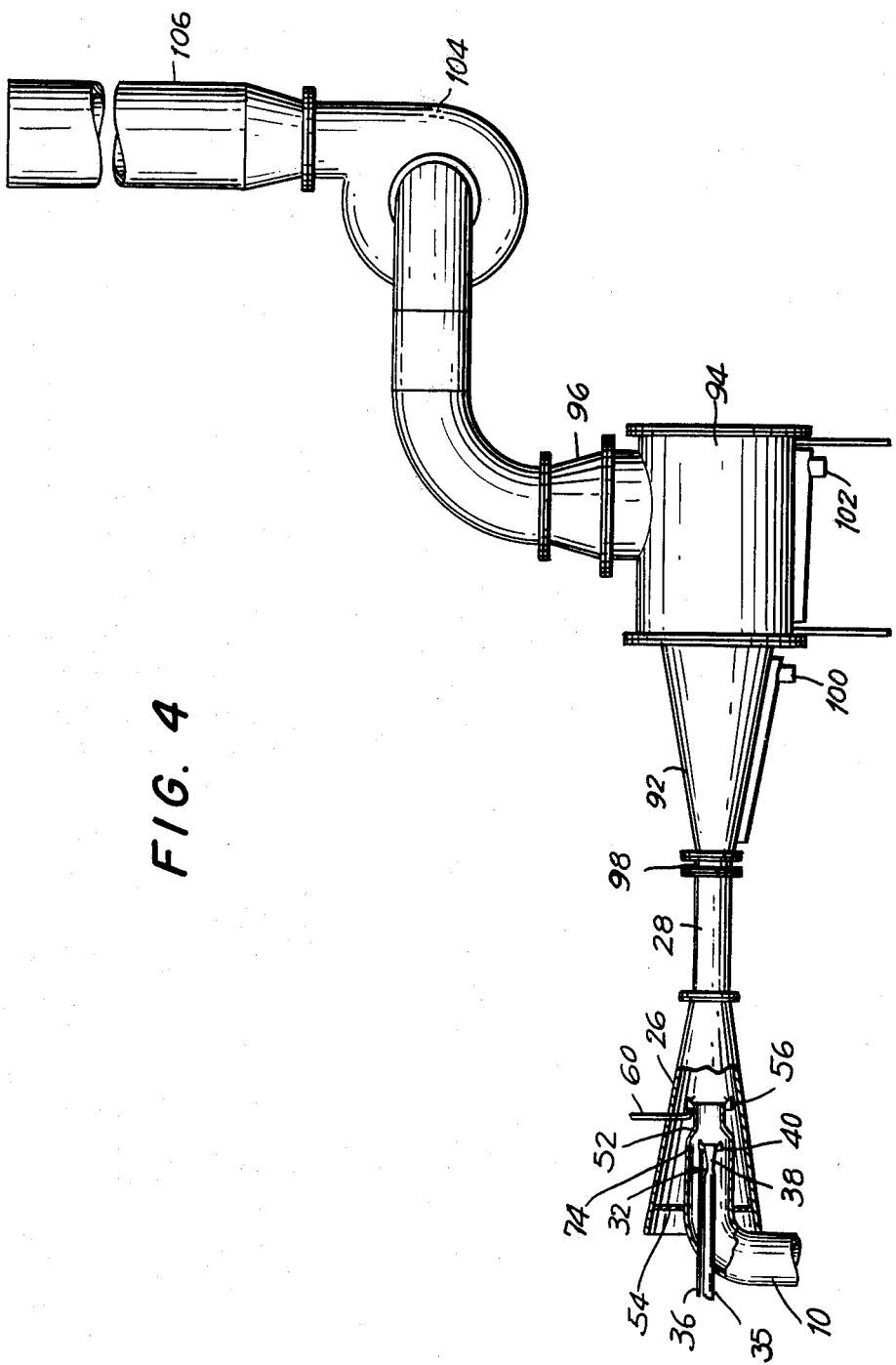
FIG. 4 is a schematic elevational view partly in section showing the apparatus of the present invention wherein the system is driven, in part, by an induced draft fan located downstream from the modified diffuser separator.
Figure 7:
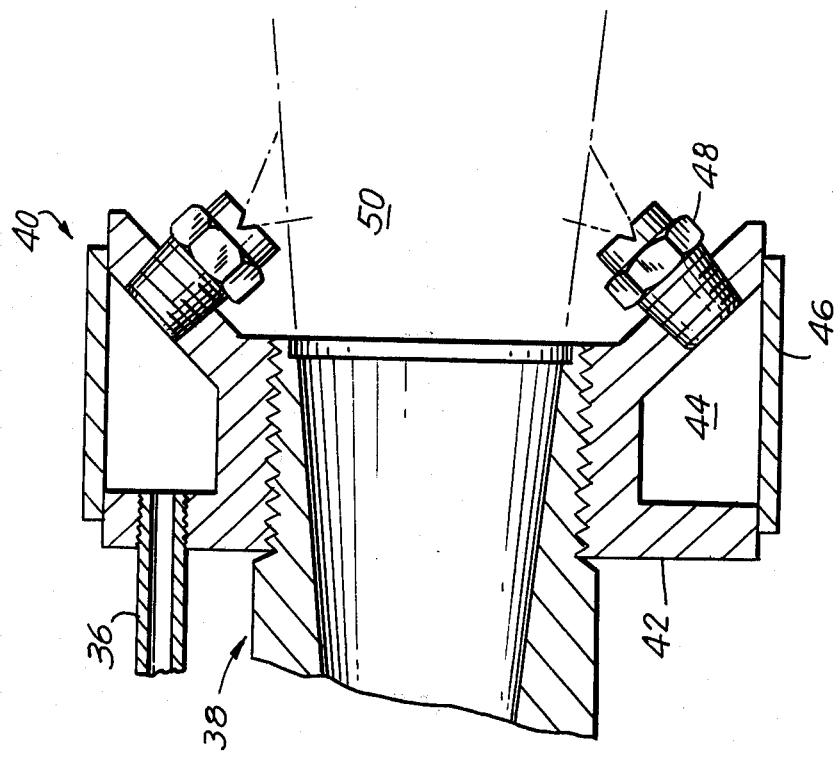
FIG. 7 is a fragmentary cross-sectional view taken along lines 7—7 of FIG. 6.

In FIG. 3, as in FIG. 1, the system is driven principally by a forced draft fan 12. The optional atomizer 14 is also shown in FIG. 3. If it is desired to utilize an induced draft fan or blower 104, such a fan may be connected between the stack 96 of the tailpipe 94 and the exhaust stack 106, as shown in FIG. 4.

In accordance with the present invention, the orientation of the supersonic and subsonic nozzles 38 and 52 and the operating parameters must meet certain design criteria. Before setting forth specific examples of the gas cleaning systems of the present invention, some further teaching concerning these matters may be helpful. First, it is desirable to provide a relatively low approach velocity of the polluted carrier gas to the subsonic nozzle 52. This is accomplished by providing an entry tube 74 having a diameter at least about half the diameter of the plate 54 at the exit end of the elbow 24. In order to attain laminar flow at the inlet of the subsonic nozzle 52, the shape of the inlet portion 108 of the subsonic nozzle should be a surface of revolution having a cross section which is a radius or, preferably, an ellipse. While it is preferable that the inside surface of the subsonic nozzle constitute a surface of revolution so that the nozzle is a three-dimensional device, a two dimensional nozzle may also be employed.

The subsonic nozzle 52 should be a well-designed nozzle as will be understood by those skilled in the art. In such a nozzle, the length of the throat 110 (as measured along the axis of the nozzle) should not be less than about 0.6d where "d" is the throat diameter. Similarly, the length of the entry portion of the subsonic nozzle should not be less than about 1.0d. Finally, the ratio of the throat diameter to the entry diameter should not be greater than 0.65. Under these conditions, the subsonic nozzle will flow full and the processes of the present invention can be carried out efficiently.

As noted above, the liquid employed in the liquid injector 40 associated with the supersonic nozzle 38 and in the liquid injector 56 associated with the subsonic nozzle 52 will usually be water (with or without chemical additives). The quantity of flow through the injectors and through the supersonic nozzle will vary depending principally upon the dust loading of the polluted carrier gas (i.e. the quantity of particulate), the kind of particulate involved, including the chemical composition and size distribution of the particulate and the mass flow of carrier gas. Although it is not possible to specify a single flow rate applicable under all conditions, the flow rate of water ($\alpha_w$) in the subsonic injector 56 will vary from 0.75 to 1.5 pounds per pound of carrier gas and will usually be between 1.1 and 1.2 pounds per pound of carrier gas. The injector water may be supplied at a pressure in the range of 5 to 40 psig, preferably 20 to 30 psig. Applicants have found that when using nozzles such as the Delavan type WFM 60 flat spray nozzles, 28 such nozzles are needed for the injector 56 on a unit designed to handle 2000 pounds of polluted carrier gas per minute while 16 nozzles are sufficient for a unit designed to handle 100 pounds of polluted carrier gas per minute. The throat diameter of the subsonic nozzle should be about 2.93 inches for a unit designed to handle 100 pounds of carrier gas per minute while a throat diameter of about 12 inches is required for a unit designed to handle 2000 pounds of carrier gas per minute. The pressure across the subsonic nozzle may vary within the range of 10 to 70 inches of water but is preferably about 35 inches of water.

Turning to the supersonic nozzle 38 and its associated injector 40, the flow rate when steam is used ($\alpha_{st}$) ranges from 0.02 to 0.1 pounds per pound of carrier gas and is preferably about 0.035. The steam may be supplied at pressures from 15 psig to 500 psig or even higher, although pressures of about 50 psig are adequate. As noted earlier, while steam is a preferred driving fluid for the supersonic nozzle 38, any compressible fluid such as air or nitrogen may be employed. The required mass flow rate of compressible fluid ($\alpha_{cf}$) is proportional to the molecular weight of the compressible fluid to be employed. As steam has a molecular weight of about 18 whereas air has a molecular weight of about 29 and nitrogen has a molecular weight of about 28, the value of $\alpha_{cf}$ when air or nitrogen is used is respectively 1.61 and 1.55 times the value of $\alpha$ for steam. When steam is employed to drive the supersonic nozzle, the nozzle may have a throat diameter of 0.157 inches for a 100 pound per minute unit or 0.589 inches for a 2000 pound per minute unit.

Figure 6:
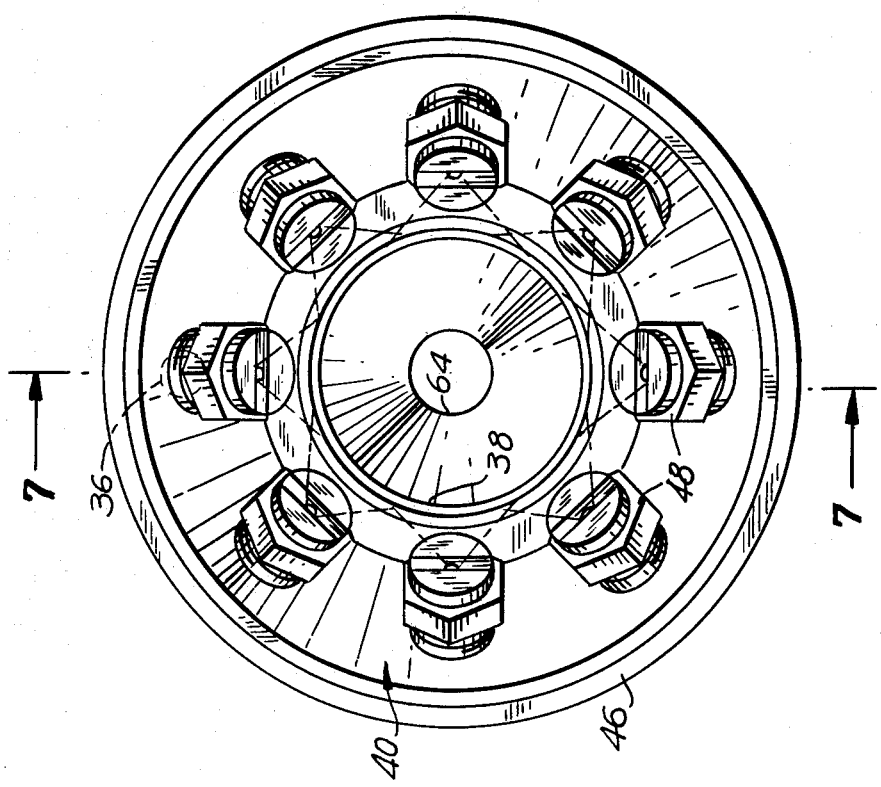
FIG. 6 is an end view of the supersonic nozzle and the liquid injector device associated with the nozzle.

The injector 40 may utilize the same spray nozzles as are employed in the subsonic injector 56 but, as less liquid is required, fewer nozzles are also required. In general, the flow rate ($\alpha_w$) is in the range of 0.09 to 0.2 pounds of water per pound of compressible fluid and, preferably about 0.1. The water pressure may be in the range of 5-40 psig, preferably 20-30 psig. For a unit designed to process 100 pounds per minute of polluted carrier gas, 6 spray nozzles are sufficient while for a unit designed to process 2000 pounds per minute of polluted carrier gas may require 8 spray nozzles, as shown in FIG. 6.

The spacing of the supersonic nozzle 38 from the subsonic nozzle 52 and the spacing of the subsonic nozzle 52 from the entrance to the mixing tube 28 are important to the proper functioning of the apparatus though the spacing of the two nozzles is the more critical dimension. As noted above, the supersonic nozzle 38 must be spaced from the subsonic nozzle 52 so that the free jet emerging from the supersonic nozzle will "hook-up" with the throat 110 of the subsonic nozzle 52. For the 100 pound per minute unit referred to above, the nozzle spacing is about 6 inches while for the 2000 pound per minute unit the spacing should be about 24 inches. The spacing of the subsonic nozzle 52 from the entry of mixing tube 28 should be about 15.6 inches for the 100 pound per minute unit having a mixing tube 6 inches in diameter and 23.9 inches long. The corresponding spacing for a 2000 pound per minute unit is about 60.11 inches where the unit uses a mixing tube 24 inches in diameter and 92.1 inches long.

The specific dimensions and operating data stated above are exemplary only and relate to systems employing a modified diffuser separating device and designed to clean the effluent of an electric furnace used for steelmaking, an effluent which is particularly difficult to clean. These dimensions may vary somewhat depending upon the characteristics of the carrier gas and the details of the operating parameters. For the electric furnace operation here considered, the inlet temperature of the carrier gas was about 150° F. and the particulate grain loading varied from 0.05 to 0.5 grains/SCF. 50% of the particulate was smaller than 1 micron while 85% of the particulate was smaller than 10 microns in size. The chemical composition of the particulate was: iron oxide 35%, zinc oxide 3%, manganese 15%, lead 2%, others, balance. The system of the present invention using a modified diffuser separator was effective to clean this carrier gas to a level of 0.0028 grains/SCF using a total energy of about 24 H.P./1000 SCF. Of this 24 H.P., about 8 H.P. was required for the fan and the balance represents the power of the steam used in the supersonic nozzle.

It will be understood that any appropriate separating device may be connected to the end of the mixing tube 28. The twin-cyclone separators described above represent a relatively low-energy separator which is particularly desirable when total water use must be minimized.

Where considerations of energy usage are paramount, the modified diffuser separator described in Ewan, et al U.S. Pat. No. 4,141,701 may be used since, in this device, a portion of the kinetic energy of the gas stream is recovered as a pressure head thereby decreasing the total energy required to drive the system.

Of course, other types of separators may also be used. With the present invention, energy may be applied to the system in a variety of ways: through fans or blowers communicating directly with the carrier gas stream; through the supersonic nozzle acting as an ejector; and through the two liquid injectors. By properly sizing and adjusting these several energy sources, the system may be optimized to provide the desired level of particulate removal at a minimum expenditure of energy.

Various materials may be used for the principal components of the system described herein. When no serious corrosion problems are presented, the atomizer, elbow, mixing tube and separator may be formed from ordinary carbon steel. Where corrosive liquids or gases are encountered, stainless steel or fiberglass may be substituted for the carbon steel. The nozzles and injectors may be formed from brass or stainless steel to insure long trouble-free life of these parts.

The terms and expressions which have been employed are used as terms of description and not of limitation and there is no intention in the use of such terms and expressions of excluding any equivalents of the features shown and described or portions thereof, but it is recognized that various modifications are possible within the scope of the invention claimed.

What is claimed is:

1. In a process for the purification of a polluted carrier gas containing pollutant material such as particulates, gases, vapors or combinations thereof wherein a stream of said polluted carrier gas is driven by blower means through a conduit and through a subsonic nozzle having an inlet communicating with said conduit, the steps of:

(a) continuously supplying pressurized compressible fluid to the inlet of a supersonic nozzle located in said conduit and expanding said compressible fluid through said supersonic nozzle to form a free supersonic jet of said compressible fluid directed from a position upstream of said subsonic nozzle through said stream of polluted carrier gas within said conduit and into the inlet of said subsonic nozzle to form in the interior of said subsonic nozzle a turbulent mixture of said polluted carrier gas with said compressible fluid, said supersonic jet expanding within said subsonic nozzle to hook up with the interior surface thereof to act as an ejector providing additional driving force to said turbulent mixture;

(b) forming a series of jet sprays of a first liquid in a first atomized condition disposed circumferentially about the free jet of compressible fluid emerging from said supersonic nozzle;

(c) further atomizing said first liquid into finely divided droplets by directing said jet sprays into the outer regions of said jet of compressible fluid as it emerges from said supersonic nozzle thus to supply to said turbulent mixture said finely divided droplets of further atomized liquid and to cause entrainment within said subsonic nozzle of at least a portion of said pollutant material in said droplets;

(d) discharging said mixture including said finely divided droplets from said subsonic nozzle to form a second free jet of said mixture and said finely divided droplets directed into a mixing tube;

(e) forming a series of jet sprays of a second liquid in a first atomized condition disposed circumferentially about said second jet as it emerges from said subsonic nozzle;

(f) further atomizing said second liquid into finely divided droplets by directing said jet sprays of said second liquid into said second jet as it emerges from said subsonic nozzle thus to form a further mixture containing the droplets of said second liquid within said mixing tube, the droplets of said first and second liquids combining and growing in size as they move through said mixing tube; and (g) separating said droplets, thus grown in size, from the remainder of said carrier gas.

2. The process described in claim 1 wherein the compressible fluid is steam.

3. The process described in claim 1 wherein the first and second liquids are water.

4. The process described in claim 3 wherein the compressible fluid is steam.

5. The process described in claim 1 wherein the droplets are separated from the remainder of the carrier gas by centrifugal separating means.

6. The process described in claim 5 wherein the compressible fluid is steam and the first and second liquids are water.

7. The process described in claim 1 wherein the droplets are separated from the remainder of the carrier gas by flow detaching means.

8. The process described in claim 6 wherein the compressible fluid is steam and the first and second liquids are water.

9. The process described in claim 1 wherein at least one of the first and second liquids has admixed therewith a basic reactant comprising at least one of the members of the group consisting of ammonia, sodium hydroxide and calcium hydroxide.

10. The process described in claim 1 and including the additional step of conditioning said polluted carrier gas in said conduit by spraying a liquid into said polluted carrier gas at a position upstream of said supersonic nozzle.

11. The process described in claim 10 wherein the liquid sprayed into said polluted carrier gas is water.

12. The process described in claim 11 wherein the compressible fluid is steam.

13. The process described in claim 12 wherein the first and second liquids are water.

14. The process described in claim 13 wherein at least one of the first and second liquids has admixed therewith a basic reactant comprising at least one of the members of the group consisting of ammonia, sodium hydroxide and calcium hydroxide.

15. In apparatus for the purification of a polluted carrier gas containing pollutant material such as particulates, gases, vapors or combinations thereof the combination of:

(a) a conduit;

(b) a subsonic nozzle having an inlet communicating with said conduit;

(c) blower means for driving a stream of said carrier gas through said conduit and said subsonic nozzle;

(d) a compressible fluid ejector comprising a supersonic nozzle within said conduit upstream of the inlet of said subsonic nozzle;

(e) means for continuously supplying pressurized compressible fluid to the inlet of said supersonic nozzle and expanding said compressible fluid through said supersonic nozzle to form a free jet of said compressible fluid directed at supersonic velocity through said stream of gas and into the inlet of said subsonic nozzle, said free jet of compressible fluid expanding within said subsonic nozzle to hook up with the interior surface thereof to act as an ejector pump providing additional driving force to said stream of polluted gas;

(f) means for forming a series of jet sprays of a first liquid in a first atomized condition disposed circumferentially about and directed into the outer regions of said jet of compressible fluid emerging from said supersonic nozzle to further atomize said first liquid into finely divided droplets to form a turbulent mixture of said droplets with said polluted carrier gas and with said compressible fluid in said subsonic nozzle and to cause entrainment of at least a portion of said pollutant material in said finely divided droplets as said turbulent mixture moves through said subsonic nozzle and emerges therefrom to form a free jet of said mixture;

(g) a mixing tube having entry and exit ends communicating at its entry end with said conduit and positioned downstream of said subsonic nozzle, said free jet of said mixture being directed into the upstream entry end of said mixing tube;

(h) means for forming a series of jet sprays of a second liquid in a first atomized condition disposed circumferentially about said free jet of said mixture emerging from said subsonic nozzle to further atomize said second liquid into finely divided droplets and to mix said finely divided droplets of said second liquid with said mixture emerging from said subsonic nozzle, the droplets of said first and second liquids combining and growing in size as they move through said mixing tube; and (i) means communicating with the exit and of said mixing tube for separating the droplets, thus grown in size, from the remainder of said carrier gas.

16. An apparatus as described in claim 15 further including means for spraying a liquid into said polluted carrier gas are associated with said conduit upstream from said supersonic nozzle.

17. An apparatus as described in claim 15 in which said means for separating the droplets from the remainder of said carrier gas comprises at least one cyclone separator.

18. An apparatus as described in claim 15 in which said means for separating the droplets from the remainder of said carrier gas comprises a modified diffuser employing flow detaching means.

19. An apparatus as described in claim 15 wherein the blower means comprises a forced draft fan located upstream from said supersonic nozzle.

20. An apparatus as described in claim 15 wherein said blower means comprises an induced draft fan located downstream from said means for separating said droplets from the remainder of said carrier gas.

21. An apparatus as described in claim 15 wherein said means for forming a series of jet sprays of said first and said second liquids comprise flat spray liquid nozzles.

* * * * *